(12) United States Patent
Kim et al.

(10) Patent No.: US 9,383,449 B2
(45) Date of Patent: Jul. 5, 2016

(54) METHOD AND APPARATUS FOR REMOVING SPOOFING SIGNAL IN SATELLITE NAVIGATION SYSTEM

(71) Applicant: ELECTRONICS AND TELECOMMUNICATIONS RESEARCH INSTITUTE, Daejeon (KR)

(72) Inventors: Tae Hee Kim, Daejeon (KR); Sang Uk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 456 days.

(21) Appl. No.: 14/049,697

(22) Filed: Oct. 9, 2013

(65) Prior Publication Data

US 2014/0111378 A1    Apr. 24, 2014

(30) Foreign Application Priority Data

Oct. 18, 2012    (KR) .................. 10-2012-0116031

(51) Int. Cl.
*G01S 19/21*    (2010.01)
*G01S 19/35*    (2010.01)
(52) U.S. Cl.
CPC ............... *G01S 19/215* (2013.01); *G01S 19/35* (2013.01)

(58) Field of Classification Search
CPC .............................. G01S 19/21; G01S 19/215
USPC ............... 342/357.4, 357.46, 357.59, 357.76; 701/468, 474
See application file for complete search history.

(56) References Cited

U.S. PATENT DOCUMENTS

| 7,764,224 B1 * | 7/2010 | Anderson | G01S 19/215 342/357.27 |
|---|---|---|---|
| 2011/0068973 A1 | 3/2011 | Humphreys et al. | |
| 2015/0234053 A1 * | 8/2015 | Psiaki | G01S 19/215 342/357.51 |

OTHER PUBLICATIONS

Sherman Lo, et al; "Signal Authentication a Secure Civil GNSS for Today", InsideGNSS; Sep./Oct. 2009; pp. 30-39.

* cited by examiner

*Primary Examiner* — Dao Phan
(74) *Attorney, Agent, or Firm* — Ladas & Parry LLP

(57) ABSTRACT

Provided is a method and apparatus for removing a spoofing signal. The apparatus may convert a global positioning system (GPS) signal from an RF signal to an IF signal, and remove a spoofing signal based on whether the spoofing signal is present in the RF signal. The apparatus may obtain and track the spoofing signal using the IF signal, and generate a characteristic of the spoofing signal. The apparatus may generate an anti-spoofing signal by shifting a phase of the spoofing signal 180 degrees based on the characteristic of the spoofing signal.

12 Claims, 8 Drawing Sheets

METHOD AND APPARATUS FOR REMOVING SPOOFING SIGNAL IN SATELLITE NAVIGATION SYSTEM

CROSS-REFERENCE TO RELATED APPLICATION

This application claims the priority benefit of Korean Patent Application No. 10-2012-0116031, filed on Oct. 18, 2012, in the Korean Intellectual Property Office, the disclosure of which is incorporated herein by reference.

BACKGROUND

1. Field of the Invention

Exemplary embodiments relate to a method of removing a spoofing signal transmitted from a signal source to deceive a GPS signal, by attaching a spoofing signal removal device to a radio frequency (RF) input terminal of a global positioning system (GPS) receiver, to ensure a normal operation of the GPS receiver while avoiding the influence of the spoofing signal.

2. Description of the Related Art

Recently, a satellite navigation system using a global positioning system (GPS) is being widely used in the field of industry. As a result, the satellite navigation system is exposed to malicious spoofing attacks.

A spoofing attack may attempt to trick or deceive a satellite navigation system with a malicious intent of creating social chaos during a military operation or an international event. For example, malfunction of a mobile communication station or erroneous position measurement of a ship may result.

Accordingly, there is a demand for GPS spoofing countermeasures absent changes being made to an existing GPS receiver. To meet such a demand, a spoofing signal may be removed by attaching a configuration for removing the spoofing signal to a radio frequency (RF) signal input terminal of a GPS receiver.

SUMMARY

An aspect of the present invention provides a method of removing a spoofing signal absent changing a global positioning system (GPS) receiver by attaching a spoofing signal removal device between a radio frequency (RF) output terminal of an antenna and an RF input terminal of the GPS receiver.

According to an aspect of the present invention, there is provided an apparatus for removing a spoofing signal, the apparatus including a radio frequency (RF)-intermediate frequency (IF) converter to convert a global positioning system (GPS) signal from an RF signal to an IF signal, and to remove a spoofing signal based on whether the spoofing signal is present in the RF signal.

The apparatus may include a spoofing signal processor to obtain and track the spoofing signal using the IF signal and to generate a characteristic of the spoofing signal.

The apparatus may include an anti-spoofing signal generator to generate an anti-spoofing signal by shifting a phase of the spoofing signal 180 degrees based on the characteristic of the spoofing signal.

The apparatus may include a spoofing signal detector/controller to determine whether the spoofing signal is present and to control the spoofing signal processor and the anti-spoofing signal generator.

The RF-IF converter may receive the RF signal from a GPS satellite through a GPS antenna, and may transmit a spoofing-free RF signal to a GPS receiver producing a GPS solution.

The RF-IF converter may include an RF divider to divide the RF signal.

The RF-IF converter may include a frequency downconverter to down-convert the divided RF signal into an IF signal.

The RF-IF converter may include an analog-digital converter to convert the IF signal from analog to digital.

The RF-IF converter may include a digital-analog converter to convert the anti-spoofing signal from a digital IF signal to an analog IF signal.

The RF-IF converter may include a frequency upconverter to up-convert the analog IF signal to an RF signal.

The RF-IF converter may include an RF mixer to mix the divided RF signal with the up-converted RF signal.

The RF-IF converter may include a clock to enable frequency synchronization between the frequency downconverter and the frequency upconverter.

The RF-IF converter may transmit the RF signal to the GPS receiver through the RF divider and the RF mixer when the spoofing signal is absent, and may generate the anti-spoofing signal using the received GPS signal and remove the spoofing signal using the anti-spoofing signal when the spoofing signal is present.

The spoofing signal processor may include a control command receiving unit to receive a control command for processing the spoofing signal from the spoofing signal detector/controller.

The spoofing signal processor may include a spoofing signal obtaining unit to obtain the spoofing signal using the digital IF signal received from the RF-IF converter.

The spoofing signal processor may include a spoofing signal tracking unit to track the spoofing signal using the obtained spoofing signal.

The spoofing signal processor may include a measurement data generating unit to generate measurement data through signal tracking.

The anti-spoofing signal generator may include a measurement data receiving unit to receive the measurement data from the spoofing signal processor.

The anti-spoofing signal generator may include a signal intensity converting unit to convert a signal intensity based on the received measurement data.

The anti-spoofing signal generator may include a code position determining unit to determine a code position based on the received measurement data.

The anti-spoofing signal generator may include a carrier phase determining unit to determine a carrier phase based on the received measurement data.

The anti-spoofing signal generator may include an anti-spoofing signal generating unit to generate an anti-spoofing signal based on the determined signal intensity, the determined code position, and the determined carrier phase.

The spoofing signal detector/controller may include a GPS data receiving unit to receive measurement data and GPS data from the GPS receiver.

The spoofing signal detector/controller may include a spoofing signal determining unit to determine whether the spoofing signal is present using the received GPS data.

The spoofing signal detector/controller may include a spoofing signal detecting unit to detect the spoofing signal based on the determined result.

The spoofing signal detector/controller may include a control command generating unit to generate and transmit a control command for removing the detected spoofing signal.

According to another aspect of the present invention, there is provided a method of removing a spoofing signal, the method including determining whether a spoofing signal is present in a received GPS signal between a radio frequency (RF) output terminal of a GPS antenna and an RF input terminal of a GPS receiver.

The method may include transmitting the received GPS signal to the RF input terminal of the GPS receiver when the spoofing signal is absent.

The method may include extracting a characteristic of the spoofing signal when the spoofing signal is present.

The method may include generating an anti-spoofing signal based on the extracted characteristic of the spoofing signal.

The method may include removing the spoofing signal using the generated anti-spoofing signal.

The determining of whether the spoofing signal is present may include down-converting the received GPS signal from an RF signal to an IF signal.

The determining of whether the spoofing signal is present may include converting the IF signal from analog to digital.

The extracting of the characteristic of the spoofing signal may include extracting Doppler information, a code position, and a signal intensity using the digital IF signal used to determine whether the spoofing signal is present.

The generating of the anti-spoofing signal may include maintaining frequency synchronization with the IF signal processed to extract the characteristic of the spoofing signal.

The removing of the spoofing signal may include converting the anti-spoofing signal from a digital IF signal to an analog IF signal.

The removing of the spoofing signal may include up-converting the analog IF signal to an RF signal.

The removing of the spoofing signal may include mixing the up-converted anti-spoofing signal with the GPS signal including the spoofing signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
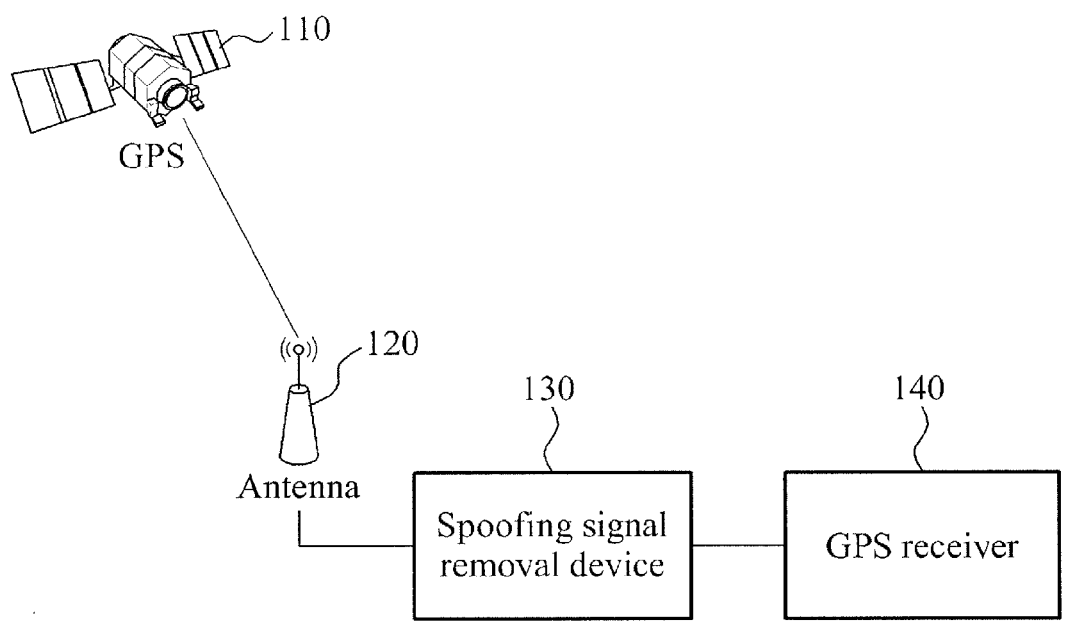
FIG. 1 is a diagram illustrating a structure of a satellite navigation system using a spoofing signal removal device according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a structure of a satellite navigation system using a spoofing signal removal device according to an exemplary embodiment of the present invention.

Referring to FIG. 1, the satellite navigation system may include a global positioning system (GPS) satellite 110, an antenna 120, a spoofing signal removal device 130, and a GPS receiver 140.

The antenna 120 may receive a GPS signal from the GPS satellite 110, and the GPS signal may include a spoofing signal. The received GPS signal may be transmitted to the spoofing signal removal device 130.

The spoofing signal removal device 130 may be located between the antenna 120 and the GPS receiver 140. The spoofing signal removal device 130 may receive the GPS signal including the spoofing signal from the antenna 120, and may detect and remove the spoofing signal. When the spoofing signal is detected, the spoofing signal removal device 130 may remove the spoofing signal, and may transmit the spoofing-free GPS signal to the GPS receiver 140 to ensure a normal operation of the GPS receiver 140 while avoiding the influence of the spoofing signal.

The GPS receiver 140 may produce a GPS solution by processing the GPS signal, and may transmit the GPS solution to the spoofing signal removal device 130 that may detect and remove the spoofing signal using the GPS solution.

Figure 2:
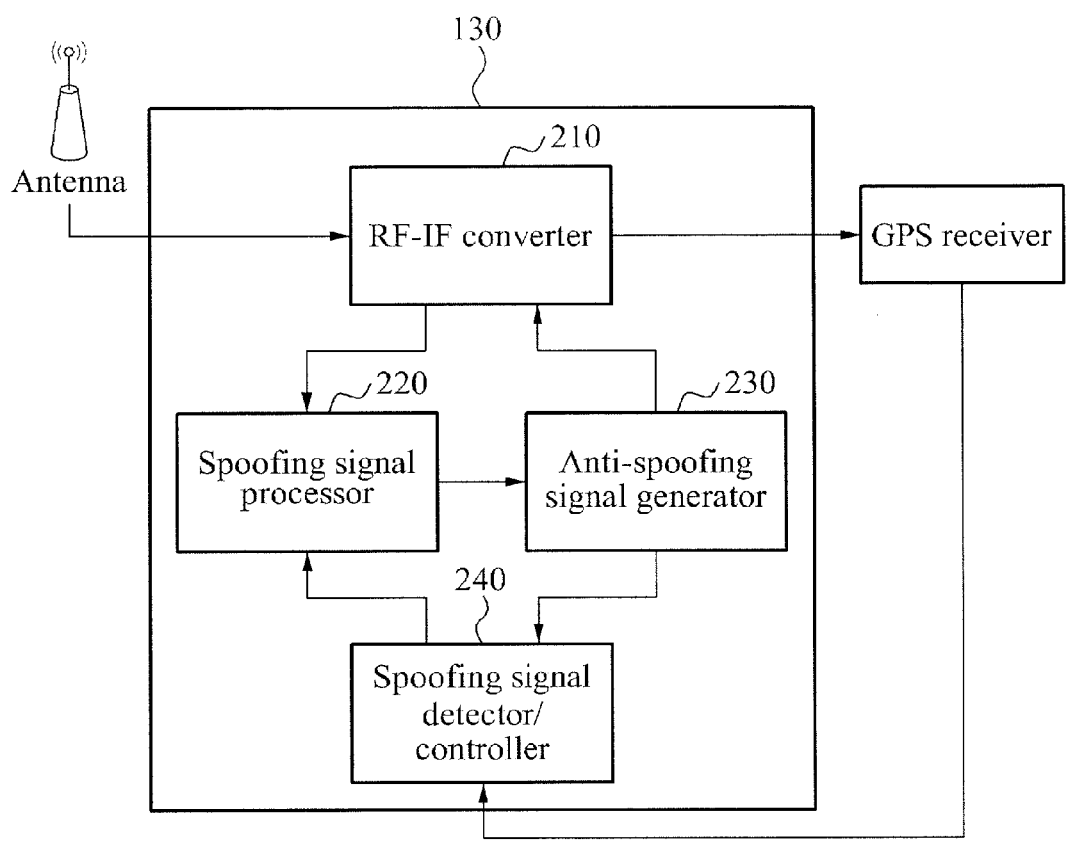
FIG. 2 is a block diagram illustrating a structure of the spoofing signal removal device of FIG. 1.

FIG. 2 is a block diagram illustrating a structure of the spoofing signal removal device 130 of FIG. 1.

The spoofing signal removal device 130 may include a radio frequency (RF)-intermediate frequency (IF) converter 210, a spoofing signal processor 220, an anti-spoofing signal generator 230, and a spoofing signal detector/controller 240.

The RF-IF converter 210 may convert the GPS signal from an RF signal to an IF signal. Also, the RF-IF converter 210 may convert the anti-spoofing signal from an IF signal to an RF signal.

The spoofing signal processor 220 may process the IF signal received from the RF-IF converter 210. The spoofing signal processor 220 may obtain the spoofing signal, and may generate characteristics of the spoofing signal, for example, Doppler information, a code position, and a signal intensity, by tracking the obtained spoofing signal.

The anti-spoofing signal generator 230 may generate the anti-spoofing signal using the characteristics of the spoofing signal generated by the spoofing signal processor 220. The anti-spoofing signal may correspond to a 180-degree phase shifted version of the spoofing signal.

The spoofing signal detector/controller 240 may detect the spoofing signal using a measurement value and location information output from the GPS receiver 140. Also, the spoofing signal detector/controller 240 may generate and transmit a control command for controlling the spoofing signal processor 220 and the anti-spoofing signal generator 230.

Figure 3:
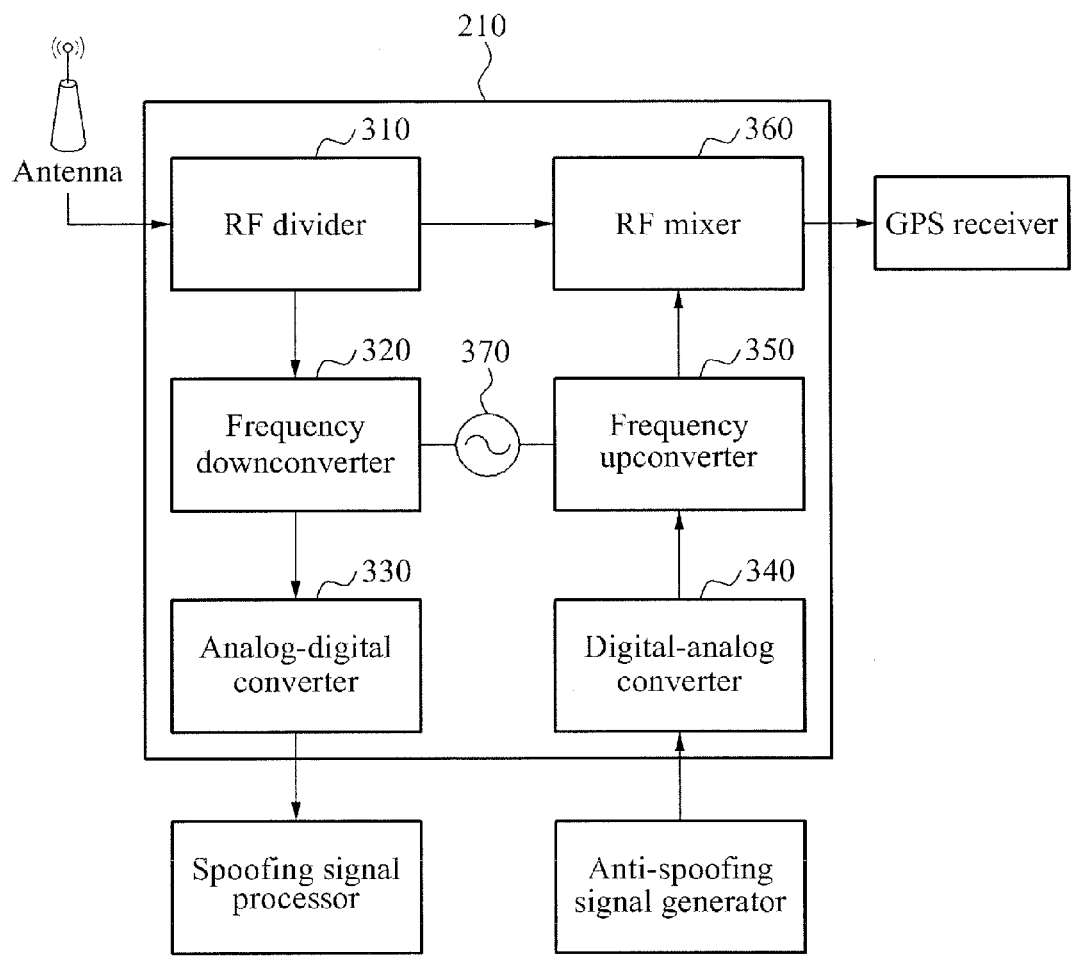
FIG. 3 is a block diagram illustrating a structure of a radio frequency (RF)-intermediate frequency (IF) converter of FIG. 2.

FIG. 3 is a block diagram illustrating a structure of the RF-IF converter 210 of FIG. 2.

The RF-IF converter 210 may include an RF divider 310, a frequency downconverter 320, an analog-digital converter 330, a digital-analog converter 340, a frequency upconverter 350, an RF mixer 360, and a clock 370.

The RF divider 310 may receive the RF signal from the antenna 120, and divide the RF signal. The divided RF signal may be provided to the RF mixer 360 and the frequency downconverter 320.

The frequency downconverter 320 may receive an analog RF signal of 1575.42 megahertz (MHz) GPS L1 band from the RF divider 310. The frequency downconverter 320 may down-convert the analog RF signal into an analog IF signal.

The analog-digital converter 330 may convert the analog IF signal into a digital IF signal. The digital IF signal may be transmitted to the spoofing signal processor 220 that may process the digital IF signal to generate the characteristics of the spoofing signal.

The digital-analog converter 340 may receive the anti-spoofing signal from the anti-spoofing signal generator 230, and may convert the anti-spoofing signal from a digital IF signal to an analog IF signal.

The frequency upconverter 350 may up-convert the analog IF signal generated by the digital-analog converter 340 into an analog RF signal.

The RF mixer 360 may mix the RF signal divided by the RF divider 310 with the analog RF signal generated by the frequency upconverter 350. The RF signal divided by the RF divider 310 and the analog RF signal generated by the frequency upconverter 350 may have opposite phases. The two signals may be mixed to remove the spoofing signal.

The clock 370 may be used for frequency synchronization between the frequency downconverter 320 and the frequency upconverter 350. Using the clock 370, the frequency downconverter 320 and the frequency upconverter 350 may maintain synchronization during the frequency conversion.

When the spoofing signal is absent, the RF signal may be transmitted from the GPS satellite 110 to the GPS receiver 140 through the RF divider 310 and the RF mixer 360 of the RF-IF converter 210.

When the spoofing signal is detected, the RF signal including the spoofing signal may be transmitted to the RF-IF converter 210 that may convert the RF signal into the digital IF signal. The digital IF signal may be transmitted to the spoofing signal processor 220 that may generate the characteristics of the spoofing signal by processing the digital IF signal. The anti-spoofing signal generated by the anti-spoofing signal generator 230 may be converted from the digital IF signal to the RF signal by the RF-IF converter 210.

By using the clock 370 between the frequency downconverter 320 and the frequency upconverter 350, synchronization may be implemented between the RF signal divided by the RF divider 310 and the RF signal output from the RF mixer 360. The frequency of 1575.42 MHz GPS L1 input in real time may be maintained in the divided RF signal and the mixed RF signal. The RF signal up-converted from the anti-spoofing signal may have a frequency of 1575.42 MHz equal to that of the RF signal input in real time.

In the RF frequency synchronized state, the spoofing signal may be removed by mixing the RF signal up-converted from the anti-spoofing signal with the RF signal input in real time. The characteristics of the spoofing signal may be generated by the spoofing signal processor 220 processing the IF signal down-converted from the RF signal divided by the RF divider 310. The anti-spoofing signal may be generated by the anti-spoofing signal generator 230 using the characteristics of the spoofing signal. The anti-spoofing signal may be generated through a phase shift for the spoofing signal. The RF signal up-converted from the anti-spoofing signal may be mixed with the RF signal input in real time, to remove the spoofing signal.

Figure 4:
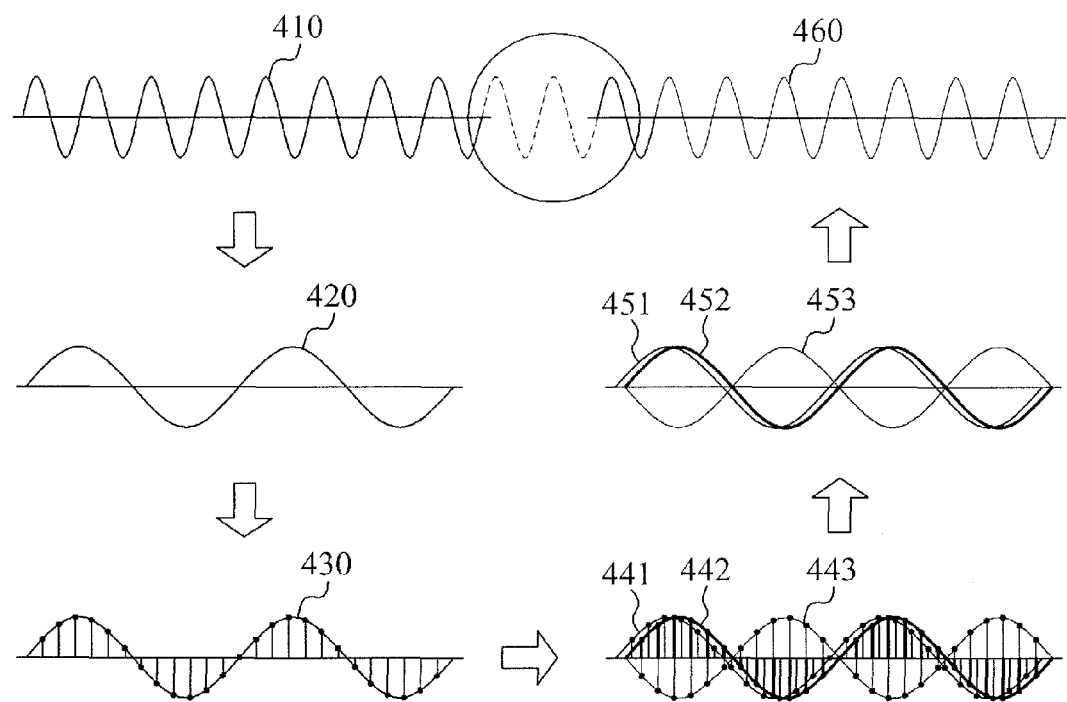
FIG. 4 is a diagram illustrating a frequency form for each block in an RF-IF converter.

FIG. 4 is a diagram illustrating a frequency form for each block in the RF-IF converter.

Referring to FIG. 4, an RF signal 410 output from the RF divider 310 may be down-converted into an analog IF signal 420 by the frequency downconverter 320. The analog IF signal 420 may be converted into a digital IF signal 430 for signal processing by the analog-digital converter 330. The digital IF signal 430 may be processed by the spoofing signal processor 220. The signal characteristic parameters of the spoofing signal, for example, Doppler information, a code position, and a signal intensity may be generated and transmitted to the anti-spoofing signal generator 230.

An anti-spoofing signal may be generated by the anti-spoofing signal generator 230 using the signal characteristic parameters. A digital IF signal 443 may be generated by predicting characteristics of an actual GPS signal 442 based on a parameter generated by the spoofing signal processor 220 processing a digital IF signal 441. The digital IF signal 443 may be converted into an analog IF signal 453 by the digital-analog converter 340. The analog IF signal 453 may be converted into an RF signal 460 by the frequency upconverter 350. Since the RF signal 460 is generated in the RF synchronized state using the clock 370, the RF signal 460 may have the synchronized frequency with the RF signal 410 input in real time.

The spoofing signal may be removed by mixing the RF signal 460 with the RF signal 410 input in real time. The spoofing-free GPS signal may be transmitted from the RF mixer 360 to the GPS receiver 140 so that the GPS receiver 140 may produce a GPS solution while avoiding the influence of the spoofing signal.

Figure 5:
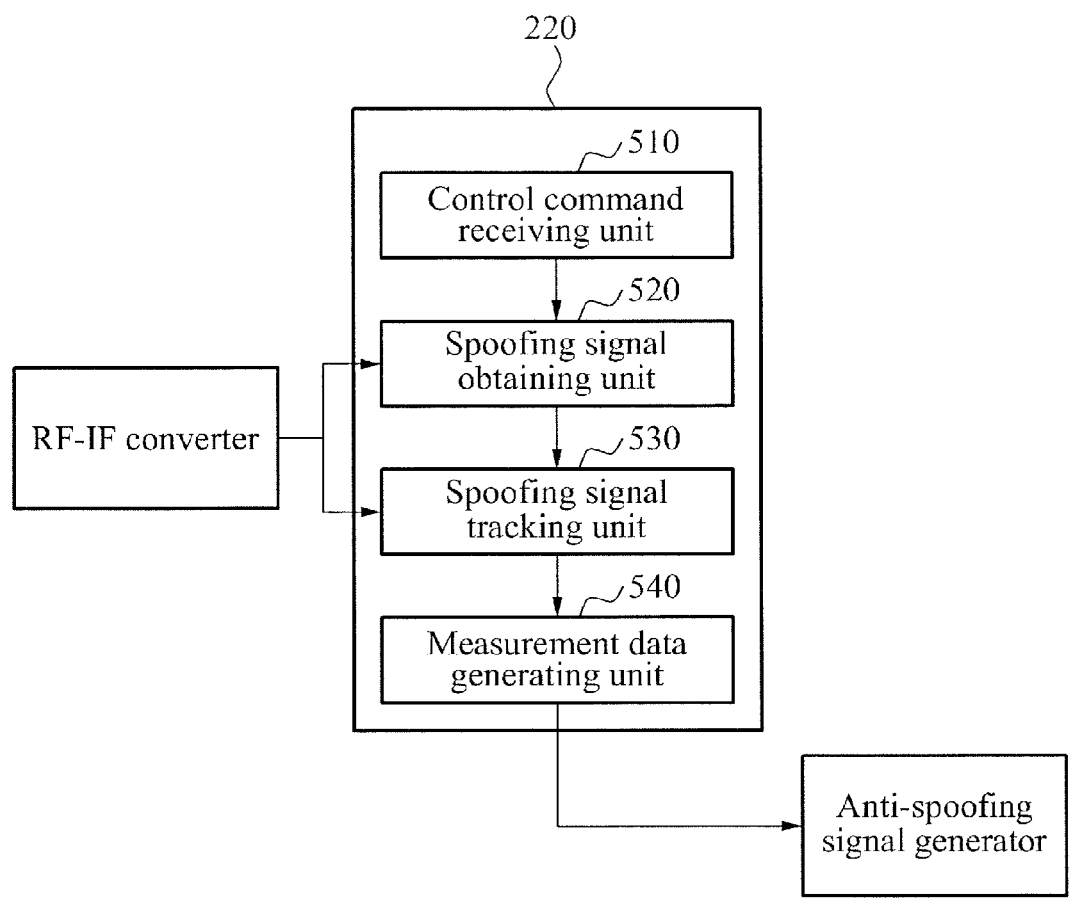
FIG. 5 is a block diagram illustrating a structure of a spoofing signal processor of FIG. 2.

FIG. 5 is a block diagram illustrating a structure of the spoofing signal processor 220 of FIG. 2.

Referring to FIG. 5, the spoofing signal processor 220 may include a control command receiving unit 510, a spoofing signal obtaining unit 520, a spoofing signal tracking unit 530, and a measurement data generating unit 540.

The control command receiving unit 510 may receive the control command for processing the spoofing signal from the spoofing signal detector/controller 240. The spoofing signal detector/controller 240 may determine whether the spoofing signal is detected, and when the spoofing signal is detected, generate pseudo random noise (PRN) information of the spoofing signal and transmit the PRN information to the control command receiving unit 510. The control command receiving unit 510 may transmit the PRN information of the spoofing signal to the spoofing signal obtaining unit 520.

The spoofing signal obtaining unit 520 may obtain the spoofing signal by receiving the digital IF signal from the RF-IF converter 210. The spoofing signal obtaining unit 520 may compute a code position and Doppler information of the spoofing signal using sample data input through the RF-IF converter 210. The computed code position and Doppler information may be transmitted to the spoofing signal tracking unit 530.

The spoofing signal tracking unit 530 may track the spoofing signal using the obtained spoofing signal. The spoofing signal tracking unit 530 may execute carrier and code tracking using the code position and the Doppler information transmitted from the spoofing signal obtaining unit 520. The spoofing signal tracking unit 530 may generate early, prompt, and late correlation values by correlating the sample data input through the RF-IF converter 210. The generated correlation value may be used in a delay locked loop (DLL). For carrier tracking, a value for a frequency component may be tracked using a frequency locked loop (FLL) and a phase locked loop (PLL). Through signal tracking, a signal intensity of the spoofing signal, a code position of the spoofing signal, and Doppler information of the spoofing signal may be generated. The generated information may be transmitted to the measurement data generating unit 540.

The measurement data generating unit 540 may generate measurement data using the information obtained through the signal tracking, and transmit the measurement data to the anti-spoofing signal generator 230. The measurement data generating unit 540 may convert the measurement data into a data format suitable for transmitting to the anti-spoofing signal generator 230 using the signal intensity of the spoofing signal, the code position of the spoofing signal, and the Doppler information of the spoofing signal received from the spoofing signal tracking unit 530, and transmit the measurement data to the anti-spoofing signal generator 230.

Figure 6:
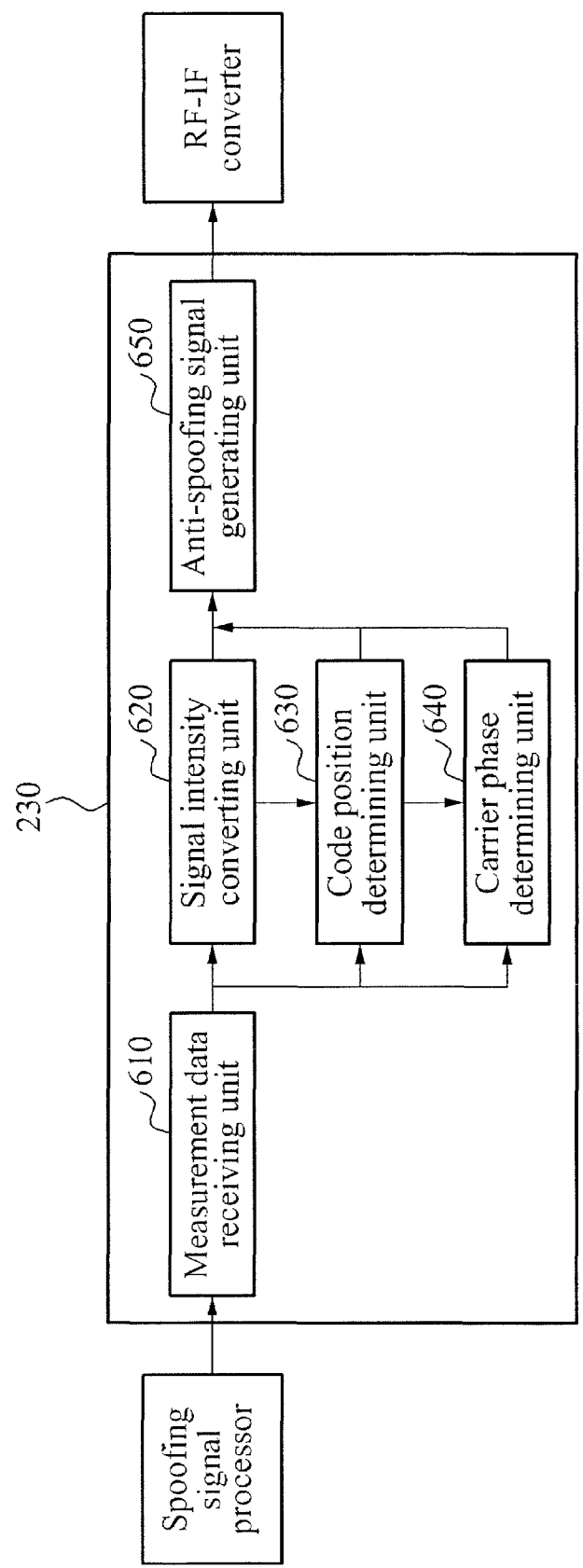
FIG. 6 is a block diagram illustrating a structure of an anti-spoofing signal generator of FIG. 2.

FIG. 6 is a block diagram illustrating a structure of the anti-spoofing signal generator 230 of FIG. 2.

Referring to FIG. 6, the anti-spoofing signal generator 230 may include a measurement data receiving unit 610, a signal intensity converting unit 620, a code position determining unit 630, a carrier phase determining unit 640, and an anti-spoofing signal generating unit 650.

The measurement data receiving unit 610 may receive the measurement data transmitted from the spoofing signal processor 220.

The signal intensity converting unit 620 may convert a signal intensity using the measurement data received by the measurement data receiving unit 610. The signal intensity converting unit 620 may determine a signal intensity of the anti-spoofing signal based on the signal intensity of the spoofing signal measured by the spoofing signal processor 220.

The code position determining unit 630 may determine a code position based on the measurement data received by the measurement data receiving unit 610.

The carrier phase determining unit 640 may determine a carrier phase based on the measurement data received by the measurement data receiving unit 610. The anti-spoofing signal may be generated by shifting the carrier phase of the spoofing signal 180 degrees.

The anti-spoofing signal generating unit 650 may generate the anti-spoofing signal using the signal intensity, the code position, and the carrier phase of the spoofing signal determined by the signal intensity converting unit 620, the code position determining unit 630, and the carrier phase determining unit 640, respectively.

Accordingly, the anti-spoofing signal may be generated by predicting and determining the code position and the carrier phase of the spoofing signal through the code position determining unit 630 and the carrier phase determining unit 640 using the parameters generated by the spoofing signal processor 220.

The GPS signal may include the signal intensity, the code, and the carrier wave.

Figure 7:
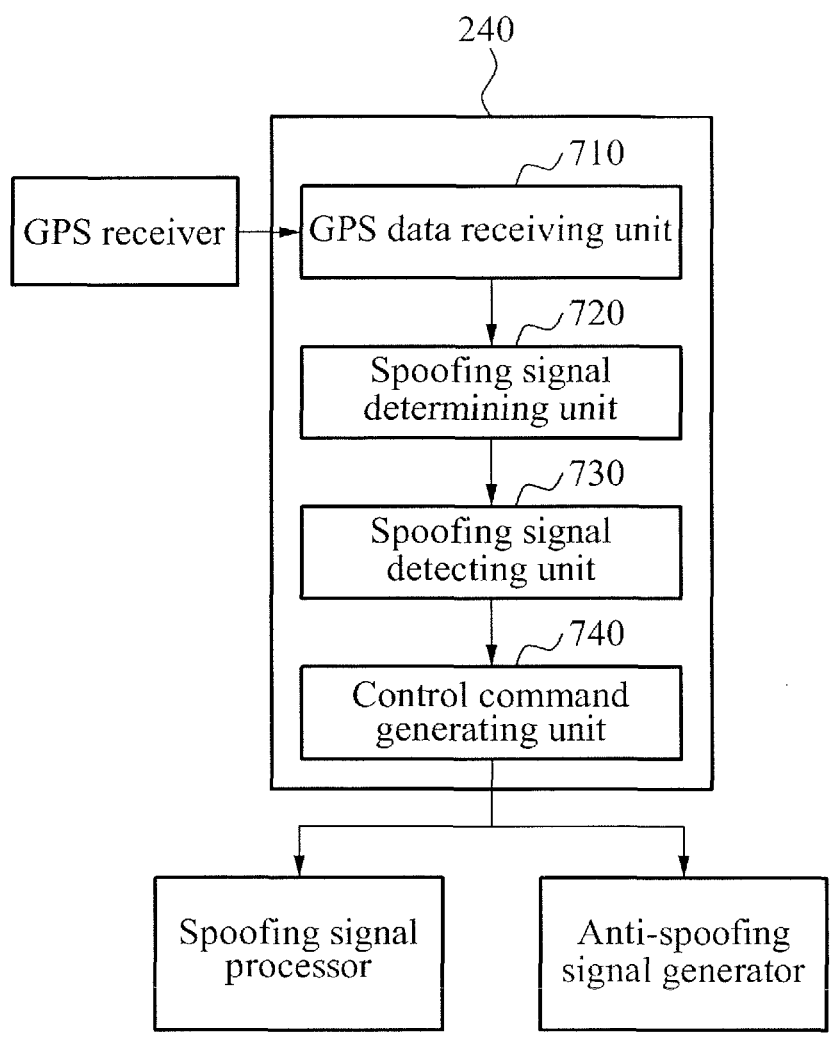
FIG. 7 is a block diagram illustrating a structure of a spoofing signal detector/controller of FIG. 2.

FIG. 7 is a block diagram illustrating a structure of the spoofing signal detector/controller 240 of FIG. 2.

Referring to FIG. 7, the spoofing signal detector/controller 240 may include a GPS data receiving unit 710, a spoofing signal determining unit 720, a spoofing signal detecting unit 730, and a control command generating unit 740.

The GPS data receiving unit 710 may receive measurement data and GPS data from the GPS receiver 140.

The spoofing signal determining unit 720 may determine whether the spoofing signal is present, using the measurement data and the GPS data received from the GPS data receiving unit 710. The spoofing signal determining unit 720 may determine whether an abnormality is present in the GPS solution produced by the GPS receiver 140, and when an abrupt change in a current location value is present, may determine that the spoofing signal is present.

The spoofing signal detecting unit 730 may detect a PRN of a spoofed satellite from the spoofing signal when the spoofing signal is determined to be present by the spoofing signal determining unit 720. The spoofing signal detecting unit 730 may detect the PRN of the spoofed satellite based on changes in signal intensity and pseudo-range for each satellite. The signal intensity of a satellite changes over time. However, when the spoofing signal is present, the signal intensity of the PRN may change abruptly. In this instance, the signal intensity of the PRN changing abruptly may correspond to a signal intensity of the spoofing signal. Accordingly, the spoofing signal detecting unit 730 may determine the PRN of the spoofed satellite.

The control command generating unit 740 may generate a control command for removing the detected spoofing signal. The generated control command may be transmitted to the spoofing signal processor 220 and the anti-spoofing signal generator 230. The control command generating unit 740 may transmit the corresponding PRN information to the spoofing signal processor 220 that may process the spoofing signal using the PRN information. The control command generating unit 740 may activate a function of the anti-spoofing signal generator 230 to generate the anti-spoofing signal using the characteristics of the spoofing signal generated by the spoofing signal processor 220.

Figure 8:
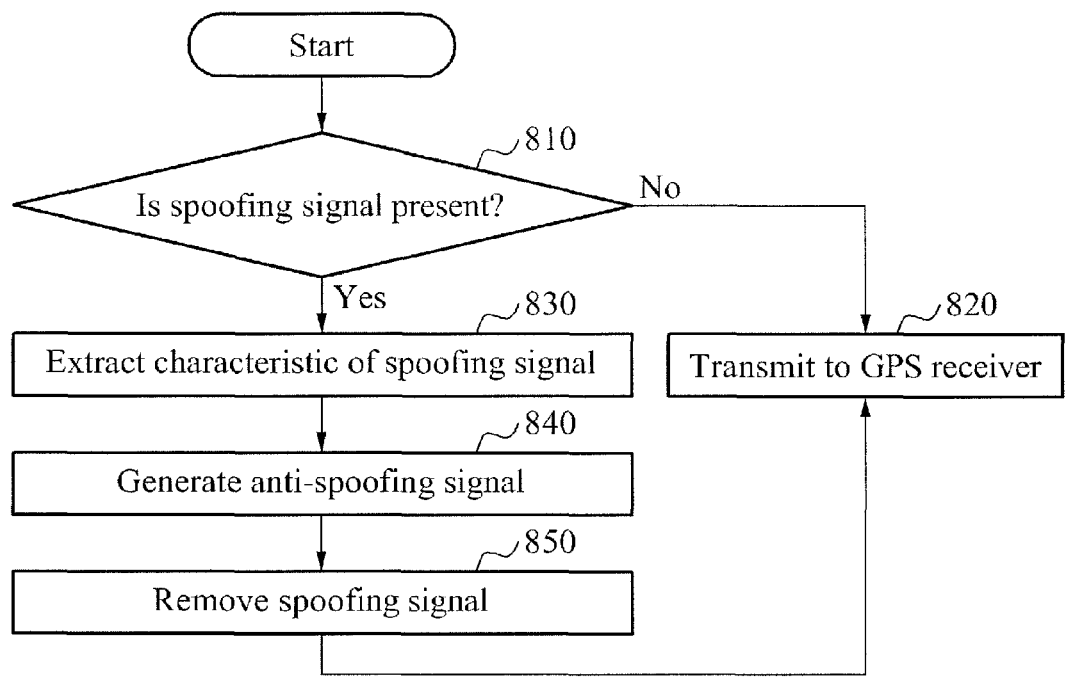
FIG. 8 is a flowchart illustrating a method of operating a spoofing signal removal device according to an exemplary embodiment of the present invention.

FIG. 8 is a flowchart illustrating a method of operating a spoofing signal removal device according to an exemplary embodiment of the present invention.

Referring to FIG. 8, in operation 810, the absence or presence of a spoofing signal may be determined using measurement data and GPS data received from the GPS receiver 140. When an abrupt change in a current location value is found using a GPS solution produced by the GPS receiver, the presence of the spoofing signal may be determined.

When the spoofing signal is determined to be absent, an RF signal may be transmitted from the GPS satellite 110 to the GPS receiver 140 in operation 820.

In operation 830, a characteristic of the spoofing signal used to generate an anti-spoofing signal may be extracted. The characteristic of the spoofing signal may include a signal intensity, a code position, and Doppler information.

To extract the characteristics of the spoofing signal, an analog RF signal received from the GPS satellite 110 may be converted into an analog IF signal. The analog IF signal may be converted into a digital IF signal suitable for signal processing for extracting the characteristics of the spoofing signal.

In operation 840, an anti-spoofing signal may be generated based on the characteristics of the spoofing signal including the signal intensity, the code position, and the Doppler information, extracted in operation 830. The anti-spoofing signal may be generated by predicting a code position and a carrier wave of the spoofing signal.

In operation 850, the spoofing signal may be removed by mixing the RF signal received from the GPS satellite 110 with the anti-spoofing signal generated in operation 840.

The anti-spoofing signal may be converted from a digital IF signal to an analog IF signal through signal processing. The analog IF signal may be up-converted into an RF signal. The RF signal may correspond to a 180-degree carrier phase shifted version of the RF signal including the spoofing signal received from the GPS satellite 110. By mixing the two RF signals, the spoofing signal may be removed from the RF signal received from the GPS satellite 110.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard discs, floppy discs, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to the exemplary embodiments, a spoofing signal may be removed by attaching a spoofing signal removal device to a global positioning system (GPS) receiver.

According to the exemplary embodiments, a normal operation of a GPS receiver may be assured, absent modification or change of an existing configuration, while avoiding the influence of a spoofing signal.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for removing a spoofing signal, the apparatus comprising:
   a radio frequency (RF)-intermediate frequency (IF) converter to convert a global positioning system (GPS) signal from an RF signal to an IF signal, and to remove a spoofing signal based on whether the spoofing signal is present in the RF signal;
   a spoofing signal processor to obtain and track the spoofing signal using the IF signal and to generate a characteristic of the spoofing signal;
   an anti-spoofing signal generator to generate an anti-spoofing signal by shifting a phase of the spoofing signal 180 degrees based on the characteristic of the spoofing signal; and
   a spoofing signal detector/controller to determine whether the spoofing signal is present and to control the spoofing signal processor and the anti-spoofing signal generator.

2. The apparatus of claim 1, wherein the RF-IF converter receives the RF signal from a GPS satellite through a GPS antenna, and transmits a spoofing-free RF signal to a GPS receiver producing a GPS solution.

3. The apparatus of claim 1, wherein the RF-IF converter comprises:
   an RF divider to divide the RF signal;
   a frequency downconverter to down-convert the divided RF signal into an IF signal;
   an analog-digital converter to convert the IF signal from analog to digital;
   a digital-analog converter to convert the anti-spoofing signal from a digital IF signal to an analog IF signal;
   a frequency upconverter to up-convert the analog IF signal to an RF signal;
   an RF mixer to mix the divided RF signal with the up-converted RF signal; and
   a clock to enable frequency synchronization between the frequency downconverter and the frequency upconverter.

4. The apparatus of claim 3, wherein the RF-IF converter transmits the RF signal to the GPS receiver through the RF divider and the RF mixer when the spoofing signal is absent, and generates the anti-spoofing signal using the received UPS signal and removes the spoofing signal using the anti-spoofing signal when the spoofing signal is present.

5. The apparatus of claim 1, wherein the spoofing signal processor comprises:
   a control command receiving unit to receive a control command for processing the spoofing signal from the spoofing signal detector/controller;
   a spoofing signal obtaining unit to obtain the spoofing signal using the digital IF signal received from the RF-IF converter;
   a spoofing signal tracking unit to track the spoofing signal using the obtained spoofing signal; and
   a measurement data generating unit to generate measurement data through signal tracking.

6. The apparatus of claim 1, wherein the anti-spoofing signal generator comprises:
   a measurement data receiving unit to receive the measurement data from the spoofing signal processor;
   a signal intensity converting unit to convert a signal intensity based on the received measurement data;
   a code position determining unit to determine a code position based on the received measurement data;
   a carrier phase determining unit to determine a carrier phase based on the received measurement data; and
   an anti-spoofing signal generating unit to generate an anti-spoofing signal based on the determined signal intensity, the determined code position, and the determined carrier phase.

7. The apparatus of claim 1, wherein the spoofing signal detector/controller comprises:
   a GPS data receiving unit to receive measurement data and GPS data from the GPS receiver;
   a spoofing signal determining unit to determine whether the spoofing signal is present using the received GPS data;
   a spoofing signal detecting unit to detect the spoofing signal based on the determined result; and
   a control command generating unit to generate and transmit a control command for removing the detected spoofing signal.

8. A method of removing a spoofing signal, the method comprising:
   determining whether a spoofing signal is present in a received GPS signal between a radio frequency (RF) output terminal of a GPS antenna and an RF input terminal of a GPS receiver;
   transmitting the received GPS signal to the RF input terminal of the GPS receiver when the spoofing signal is absent;
   extracting a characteristic of the spoofing signal when the spoofing signal is present;
   generating an anti-spoofing signal based on the extracted characteristic of the spoofing signal; and
   removing the spoofing signal using the generated anti-spoofing signal.

9. The method of claim 8, wherein the determining of whether the spoofing signal is present comprises:
   down-converting the received GPS signal from an RF signal to an IF signal; and
   converting the IF signal from analog to digital.

10. The method of claim 8, wherein the extracting of the characteristic of the spoofing signal comprises:
    extracting Doppler information, a code position, and a signal intensity using the digital IF signal used to determine whether the spoofing signal is present.

11. The method of claim 8, wherein the generating of the anti-spoofing signal comprises:
    maintaining frequency synchronization with the IF signal processed to extract the characteristic of the spoofing signal.

12. The method of claim 8, wherein the removing of the spoofing signal comprises:
    converting the anti-spoofing signal from a digital IF signal to an analog IF signal;
    up-converting the analog IF signal to an RF signal; and
    mixing the up-converted anti-spoofing signal with the GPS signal including the spoofing signal.

* * * * *